United States Patent Office 3,793,314
Patented Feb. 19, 1974

3,793,314
**CINNAMIC ACID ESTERS OF 7-NITRO-
8-HYDROXY-QUINOLINE**
Dante Nardi, Elena Massarani, and Ludwig Degen,
Milan, Italy, assignors to Recordati S.A. Chemical and
Pharmaceutical Company, Lugano, Switzerland
No Drawing. Filed Jan. 19, 1970, Ser. No. 4,065
Claims priority, application Italy, Feb. 10, 1969,
12,676/69
Int. Cl. C07d 33/48
U.S. Cl. 260—240 J                           2 Claims

ABSTRACT OF THE DISCLOSURE

Therapeutically active esters having the formula

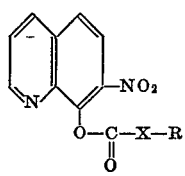

(I)

and processes for their preparation and for preparing intermediates thereof.

SUMMARY OF THE INVENTION

This invention relates to therapeutically active 7-nitro-8-hydroxy-quinoline esters having the general formula:

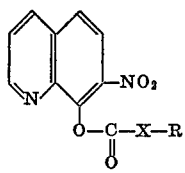

(I)

wherein X represents a single bond or a saturated or unsaturated aliphatic hydrocarbon group having a straight or branched chain, and R represents a hydrogen atom, an aryl group or a substituted or unsubstituted heterocyclic group.

Preferably, R represents a group having the following general formula

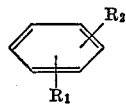

wherein $R_1$ and $R_2$ each represents hydrogen, halogen or a nitro, hydroxy, amino, alkyl or alkoxy group, or further, when $R_1$ represents hydrogen, $R_2$ represents a phenyl, phenoxy, phenylthio or alkylthio group;

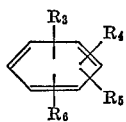

wherein each symbol $R_3$, $R_4$ and $R_5$ represents an alkyl or an alkoxy group and $R_6$ represents hydrogen or each of the symbols $R_3$, $R_4$, $R_5$ and $R_6$ represents an alkyl group:

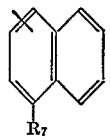

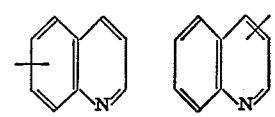

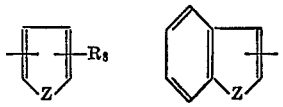

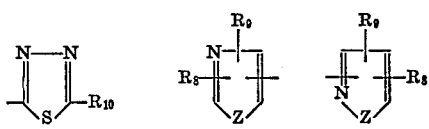

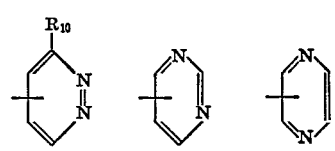

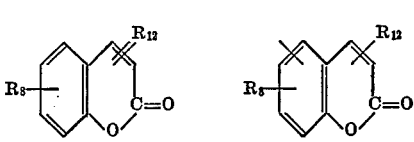

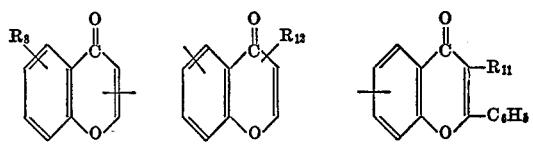

wherein $R_7$ represents H or Cl, $R_8$ represents H, $CH_3$, halogen or $NO_2$, $R_9$ represents H or phenyl, $R_{10}$ represents H, $CH_3$ or $NH_2$, $R_{11}$ represents H or $CH_3$, $R_{12}$ represents H, $CH_3$ or alkoxy, and Z represents O, S or NH.

The esters of general Formula I have useful pharmacological properties. More particularly, they can be used as antibacterial and antifungal agents for human and animal therapy.

This invention also relates to a process for the preparation of esters having the general Formula I. This process is characterized in that 7-nitro-8-hydroxy-quinoline is esterified with an acid of general formula:

R—X—COOH wherein R and X are as above defined.

This method can be carried out in accordance with the known methods for the preparation of esters. Thus, the chloride of the acid R—X—COOH can be reacted with 7-nitro-8-hydroxy-quinoline or with an alkali metal derivative of 7-nitro-8-hydroxy-quinoline. When 7-nitro-8-hydroxy-quinoline is used in its free form, the reaction is preferably carried out in the presence of an acid binding agent, such as pyridine. An alternate method consists of reacting the R—X—COOH acid anhydride with 7-nitro-8-hydroxy-quinoline.

7-nitro-8-hydroxy-quinoline is a known compound. However, a novel method for its preparation has now been found, wherein 7-nitro-8-hydroxy-quinoline-5-sulfonic acid having the following formula

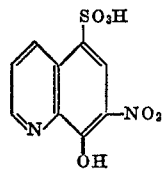

is hydrolized.

This hydrolysis can be carried out in a good yield with aqueous sulfuric acid.

It is known that 7-nitro-8-hydroxy-quinoline-5-sulfonic acid can be prepared by nitrating 8-hydroxy-quinoline-5-sulfonic acid. However, under the conditions previously used, the nitration efficiency was poor and significant amounts of 5,7-dinitro-8-hydroxy-quinoline were formed as a by-product. It has now been found that the by-product is formed in substantially negligible amounts when the nitration is carried out at a temperature maintained between —5 C. and +5 C. Further, it is preferable to carry out the nitration by the dropwise addition of 30–50% aqueous nitric acid to a cooled solution of 8-hydroxy-quinoline-5-sulfonic acid in concentrated sulfuric acid over a period of 4 to 8 hours.

The 7-nitro-8-hydroxy-quinoline esters of the invention are useful for topical therapy of fungal and bacterial infections of skin and mucosa. They may be administered externally, e.g. as lotion, ointment or cream containing about 0.5 to 5.0% active compound together with conventional carriers, adjuvants, excipients, stabilizers, etc. as required.

For this purpose, a preferred compound of the invention is 7-nitro-8-(α-methyl)cinnamoyloxy-quinoline.

The following example illustrates the method of preparing 7-nitro-8-hydroxy-quinoline.

EXAMPLE 1

7-nitro-8-hydroxy-quinoline-5-sulfonic acid 45 g. (0.2 mole) of 8-hydroxy-quinoline-5-sulfonic acid are dissolved in 126 ml. of cold concentrated sulfuric acid. While this solution is maintained between —5° C. and +5° C., 77 ml. of 30–50% aqueous nitric acid are added over a period of 8 hours. The reaction mixture is then poured onto 400 g. of ice.

The precipitate formed is recovered by filtration and is washed with water.

43–48 g. of crude 7-nitro-8-hydroxy-quinoline-5-sulfonic acid, melting at 264° C. with decomposition, are obtained (80–90% of the theoretical yield). This product is used for the next stage, without being purified, although it contains a small amount of 5,7-dinitro-8-hydroxy-quinoline.

7-nitro-8-hydroxy-quinoline

A solution of 54 g. of 7-nitro-8-hydroxy-quinoline-5-sulfonic acid is heated in 290 ml. of 60% sulfuric acid for 6 hours at 150° C. The solution is poured onto 500 g. of ice, it is filtered to remove the 5,7-dinitro-8-hydroxy-quinoline (5–10 g.; the starting material contained this impurity). While maintaining the temperature below 20° C., the filtrate is neutralized at a pH of from 5 to 6 with an alkali, such as NaOH or NH$_4$OH.

The precipitate is collected by centrifugation and dried. It melts at 162–163° C. after crystallization in 40% acetic acid. Yield, 27–30 g. (70–80% of theoretical).

*Analysis.*—Found (percent): C, 56.76; H, 3.41; N, 14.65. Calculated for C$_9$H$_6$N$_2$O$_3$ (percent): C, 56.84; H, 3.18; N, 14.73.

DESCRIPTION OF THE PREFERRED EMBODIMENTS

The following examples illustrate the method of preparation of 7-nitro-8-hydroxy-quinoline esters having general Formula I.

EXAMPLE 2

7-nitro-8-benzoyloxy-quinoline

Into a solution of 5.7 g. (0.03 mole) of 7-nitro-8-hydroxy-quinoline in 50 ml. of pyridine, cooled to 15° C., 4.2 g. (0.03 mole) of benzoyl chloride are poured dropwise, over a period of 5 minutes. The mixture is maintained at 15° C. for 3 hours, and is then poured into cold water. The precipitate formed is then collected by filtration and is washed with water. The amount of product obtained is 6.75 g. By adjusting the pH of the mother liquors to 2, 0.800 g. of 7-nitro-8-hydroxy-quinoline are recovered. The yield, calculated on the basis of the starting materials which have in fact reacted, is 89% of the theoretical yield. The 7-nitro-8-benzoyloxy-quinoline thus obtained is soluble in cold acetone and chloroform, and in hot methanol, ethanol and benzene. It is not soluble in ether and is insoluble in water. This substance has a melting point of 184–5° C., which does not change after crystallization in benzene.

EXAMPLE 3

7-nitro-8-acetoxy-quinoline

A suspension of 5.7 g. (0.03 mole) of 7-nitro-8-hydroxy-quinoline in 20 ml. acetic anhydride is refluxed for one hour, and the reaction mixture is then poured into water. The precipitate formed is collected by filtration, and yellow 7-nitro-8-acetoxy-quinoline is obtained with a practically theoretical yield. This substance has a melting point of 159–160° C., which remains unchanged after crystallization in benzene. This substance is soluble in cold acetone and chloroform, and in hot methanol, ethanol and benzene. It is not very soluble in ether and insoluble in water.

EXAMPLE 4

7-nitro-8-phenacetoxy-quinoline

To 1.9 g. (0.01 mole) of 7-nitro-8-hydroxy-quinoline in 35 ml. of anhydrous benzene, 0.48 g. (0.01 mole) of an oily 50% suspension of sodium hydride are added and the mixture is refluxed for 2 hours with stirring. The mixture is then cooled to 20° C., and 1.54 g. (0.01 mole) of phenacetyl chloride are added dropwise thereto, the mixture is then refluxed for a further 20 hours. The solvent is then vacuum-distilled, the residue is washed with water, then dried and taken up with a very small amount of ethyl acetate; a fine suspension is thus obtained, which is then poured onto a column of silicagel. The product from the column is then eluted with ethyl acetate. The eluate is evaporated, and 4.32 g. of product melting at 110–120° C. are obtained.

The identification characteristics of the compounds prepared in Examples 2, 3 and 4 above, and of other compounds prepared in a similar manner, are given in Tables I and II below. The compounds prepared in Examples 2, 3 and 4 are compounds Nos. 1, 34 and 33 respectively in the tables.

TABLE I

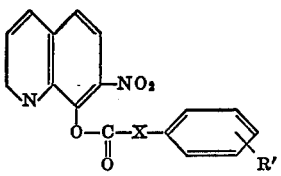

| Compound number | X | R' | Crystallization solvent* | M.P. | Formula | Calculated | | | | Found | | | |
|---|---|---|---|---|---|---|---|---|---|---|---|---|---|
| | | | | | | C | H | N | Cl | C | H | N | Cl |
| 1 | | H | B | 184-185 | C₁₆H₁₀N₂O₄ | 65.30 | 3.43 | 9.52 | | 65.61 | 3.46 | 9.45 | |
| 2 | | 4-CH₃ | A | 144 | C₁₇H₁₂N₂O₄ | 66.23 | 3.92 | 9.09 | | 66.43 | 4.13 | 8.93 | |
| 3 | | 3-CH₃ | A | 161 | C₁₇H₁₂N₂O₄ | 66.23 | 3.92 | 9.09 | | 66.08 | 4.03 | 9.10 | |
| 4 | | 2-CH₃ | A | 125 | C₁₇H₁₂N₂O₄ | 66.23 | 3.92 | 9.09 | | 65.89 | 3.86 | 9.06 | |
| 5 | | 4-Cl | A | 154-155 | C₁₆H₉ClN₂O₄ | 58.46 | 2.76 | 8.52 | 10.71 | 58.20 | 2.90 | 8.49 | 10.99 |
| 6 | | 3-Cl | A | 141 | C₁₆H₉ClN₂O₄ | 58.46 | 2.76 | 8.52 | 10.79 | 58.31 | 2.90 | 8.49 | 11.07 |
| 7 | | 2-Cl | A | 123 | C₁₆H₉ClN₂O₄ | 58.46 | 2.76 | 8.52 | 10.79 | 58.30 | 2.78 | 8.86 | 11.07 |
| 8 | | 4-Br | A | 178-179 | C₁₆H₉BrN₂O₄ | 51.49 | 2.43 | 7.50 | | 51.83 | 2.74 | 7.23 | |
| 9 | | 3-Br | A | 157 | C₁₆H₉BrN₂O₄ | 51.49 | 2.43 | 7.50 | | 51.82 | 2.36 | 7.06 | |
| 10 | | 2-Br | A | 124 | C₁₆H₉BrN₂O₄ | 51.49 | 2.43 | 7.50 | | 51.52 | 2.53 | 7.35 | |
| 11 | | 2-I | A | 133-134 | C₁₆H₉JN₂O₄ | 45.73 | 2.15 | 6.66 | | 45.85 | 2.04 | 6.59 | |
| 12 | | 2,4-Cl | A | 157 | C₁₆H₈Cl₂N₂O₄ | 52.91 | 2.22 | 7.71 | | 53.13 | 2.59 | 7.53 | |
| 13 | | 3,4-Cl | A | 175-179 | C₁₆H₈Cl₂N₂O₄ | 52.91 | 2.22 | 7.71 | | 53.09 | 2.44 | 7.46 | |
| 14 | | 2-Cl-4-NO₂ | B | 158-159 | C₁₆H₈ClN₃O₆ | 51.42 | 2.15 | 11.24 | | 51.74 | 2.52 | 10.94 | |
| 15 | | 2-Cl-6-NO₂ | B | 186-187 | C₁₆H₈ClN₃O₆ | 51.42 | 2.15 | 11.24 | | 51.75 | 2.00 | 11.41 | |
| 16 | | 2-NO₂-4-Cl | B | 153-154 | C₁₆H₈ClN₃O₆ | 51.42 | 2.15 | 11.24 | | 51.51 | 2.24 | 11.26 | |
| 17 | | 4-NO₂ | A | 183-185 | C₁₆H₉N₃O₆ | 56.64 | 2.67 | 12.39 | | 56.78 | 2.89 | 12.00 | |
| 18 | | 2-NO₂ | A | 148 | C₁₆H₉N₃O₆ | 56.64 | 2.67 | 12.39 | | 56.82 | 2.84 | 12.19 | |
| 19 | | 4-CH₃O | A | 190 | C₁₇H₁₂N₂O₅ | 62.96 | 3.73 | 8.64 | | 62.65 | 3.62 | 8.40 | |
| 20 | | 3-CH₃O | A | 137 | C₁₇H₁₂N₂O₅ | 62.96 | 3.73 | 8.64 | | 62.79 | 3.87 | 8.36 | |
| 21 | | 2-CH₃O | A | 154 | C₁₇H₁₂N₂O₅ | 62.96 | 3.73 | 8.64 | | 62.67 | 4.02 | 8.89 | |
| 22 | | 2,3-CH₃O | A | 134-135 | C₁₈H₁₄N₂O₆ | 61.01 | 3.98 | 7.91 | | 60.78 | 4.10 | 7.96 | |
| 23 | | 3,4-CH₃O | A | 195-196 | C₁₈H₁₄N₂O₆ | 61.01 | 3.98 | 7.91 | | 61.11 | 4.20 | 7.81 | |
| 24 | | 3,4,5-CH₃O | A | 199-202 | C₁₉H₁₆N₂O₇ | 59.37 | 4.20 | 7.29 | | 59.35 | 3.92 | 7.34 | |
| 25 | | 4-C₆H₅O | A | 157-158 | C₂₂H₁₄N₂O₅ | 68.39 | 3.65 | 7.25 | | 68.74 | 3.66 | 6.99 | |
| 26 | | 3-C₆H₅O | A | 175-176 | C₂₂H₁₄N₂O₅ | 68.39 | 3.65 | 7.25 | | 68.40 | 3.92 | 7.25 | |
| 27 | | 2-C₆H₅ | A | 150 | C₂₂H₁₄N₂O₄ | 71.35 | 3.81 | 7.56 | | 71.45 | 4.09 | 7.34 | |
| 28 | | 4-C(CH₃)₃ | A | 193-194 | C₂₀H₁₈N₂O₄ | 68.56 | 5.18 | 8.00 | | 68.93 | 5.20 | 7.94 | |
| 29 | | 4-C₂H₅O | A | 140 | C₁₈H₁₄N₂O₅ | 63.93 | 4.17 | 8.28 | | 63.60 | 4.59 | 8.19 | |
| 30 | CH=CH | H | A | 144 | C₁₈H₁₂N₂O₄ | 67.50 | 3.78 | 8.75 | | 67.15 | 3.70 | 8.74 | |
| 31 | C=CH / CH₃ | H | A | 123-125 | C₁₉H₁₄N₂O₄ | 68.25 | 4.22 | 8.38 | | 68.08 | 4.21 | 8.60 | |
| 32 | | 2-OCOCH₃ | A | 151-152 | C₁₈H₁₂N₂O₆ | 61.36 | 3.43 | 7.95 | | 61.39 | 3.86 | 7.98 | |
| 33 | CH₂ | H | A | 110-112 | C₁₇H₁₂N₂O₄ | 66.23 | 3.92 | 9.09 | | 66.20 | 4.08 | 8.93 | |
| 46 | | 2-C₆H₅O | A | 122-123 | C₂₂H₁₄N₂O₅ | 68.39 | 3.65 | 7.25 | | 68.35 | 3.26 | 7.28 | |
| 47 | | 4-C₆H₅ | A | 166-168 | C₂₂H₁₄N₂O₄ | 71.35 | 3.81 | 7.56 | | 70.96 | 4.35 | 7.84 | |
| 48 | CH=CH | 3,4-CH₃O | A | 167 | C₂₀H₁₆N₂O₆ | 63.15 | 4.24 | 7.37 | | 62.89 | 4.45 | 7.10 | |
| 49 | CH=CH | 2,4-Cl | A | 171-173 | C₁₈H₁₀Cl₂N₂O₄ | 55.54 | 2.59 | 7.19 | 18.22 | 55.48 | 2.81 | 6.91 | 18.02 |
| 50 | CH=CH | 4-CH₃O | A | 153-155 | C₁₉H₁₄N₂O₅ | 65.14 | 4.03 | 8.00 | | 64.86 | 4.24 | 7.97 | |
| 51 | C=CH / C₆H₅ | H | A | 170-173 | C₂₄H₁₆N₂O₄ | 72.72 | 4.07 | 7.07 | | 72.67 | 4.23 | 7.04 | |
| 53 | | 3-C₂H₅O | A | 140 | C₁₈H₁₄N₂O₅ | 63.90 | 4.17 | 8.28 | | 63.65 | 4.27 | 8.01 | |
| 54 | | 2-C₂H₅O | A | 112 | C₁₈H₁₄N₂O₅ | 63.90 | 4.17 | 8.28 | | 64.22 | 4.19 | 8.40 | |
| 55 | | 2-OH | A | 179 | C₁₆H₁₀N₂O₅ | 61.94 | 3.25 | 9.03 | | 61.86 | 3.58 | 8.89 | |
| 56 | | 2-SC₆H₅ | A | 176-177 | C₂₂H₁₄N₂O₄S | 65.67 | 3.51 | 6.96 | 7.95 | 65.49 | 3.62 | 7.14 | 7.85 |
| 57 | | 3-SC₆H₅ | A | 184-185 | C₂₂H₁₄N₂O₄S | 65.67 | 3.51 | 6.96 | 7.95 | 65.81 | 3.71 | 7.11 | 7.80 |
| 58 | | 4-SC₆H₅ | A | 162-163 | C₂₂H₁₄N₂O₄S | 65.67 | 3.51 | 6.96 | 7.95 | 65.33 | 3.79 | 6.99 | 8.30 |
| 59 | C=CH / C₂H₅ | | A | 104-106 | C₂₀H₁₆N₂O₄ | 68.96 | 4.63 | 8.04 | | 68.61 | 4.76 | 7.79 | |
| 60 | CH=CH | 4-CH₃ | A | 176-177 | C₁₉H₁₄N₂O₄ | 68.25 | 4.22 | 8.38 | | 68.16 | 4.57 | 8.27 | |
| 61 | CH=CH | 2-Cl | A | 174-175 | C₁₈H₁₁ClN₂O₄ | 60.94 | 3.12 | 7.89 | 9.99 | 60.69 | 3.17 | 7.65 | 10.28 |
| 62 | CH=CH | 3-Cl | A | 154-155 | C₁₈H₁₁ClN₂O₄ | 60.94 | 3.12 | 7.89 | 9.99 | 61.30 | 3.43 | 7.52 | 10.17 |
| 63 | CH=CH | 4-Cl | A | 169-170 | C₁₈H₁₁ClN₂O₄ | 60.44 | 3.12 | 7.89 | 9.99 | 60.76 | 3.13 | 7.73 | 9.83 |
| 64 | CH=CH | 3,4-Cl | A | 159-160 | C₁₈H₁₀Cl₂N₂O₄ | 55.54 | 2.59 | 7.19 | 18.22 | 55.64 | 2.59 | 7.34 | 18.13 |
| 65 | CH=CH | 3NO₂ | A | 184-185 | C₁₈H₁₁N₃O₆ | 59.18 | 3.04 | 11.50 | | 59.43 | 3.06 | 11.25 | |
| 66 | CH=CH | 4NO₂ | D | 204-205 | C₁₈H₁₁N₃O₆ | 59.18 | 3.04 | 11.50 | | 58.94 | 3.15 | 11.62 | |
| 67 | CH=CH | 3-OCH₂O-4 | D | 199-200 | C₁₉H₁₂N₂O₆ | 62.64 | 3.3 | 7.69 | | 62.40 | 3.79 | 7.87 | |
| 68 | CH=CH | 2-CH₃O | A | 133-134 | C₁₉H₁₄N₂O₅ | 65.14 | 4.03 | 8.00 | | 64.72 | 4.06 | 7.88 | |
| 69 | CH=CH | 3-CH₃O | A | 158 | C₁₉H₁₄N₂O₅ | 65.14 | 4.03 | 8.00 | | 64.82 | 3.81 | 7.97 | |
| 70 | CH=CH | 2,3-CH₃O | A | 144-145 | C₂₀H₁₆N₂O₆ | 63.15 | 4.24 | 7.37 | | 62.92 | 3.85 | 7.32 | |
| 71 | CH=CH | 2,4-CH₃O | A | 198-199 | C₂₀H₁₆N₂O₆ | 63.15 | 4.24 | 7.37 | | 62.93 | 4.33 | 7.11 | |
| 72 | C=CH / CH₃ | 4-CH₃ | A | 186-187 | C₂₀H₁₆N₂O₄ | 68.96 | 4.63 | 8.04 | | 68.95 | 4.49 | 7.90 | |
| 73 | Same | 2-Cl | A | 117-118 | C₁₉H₁₃ClN₂O₄ | 61.89 | 3.55 | 7.59 | 9.61 | 62.01 | 3.89 | 7.39 | 9.53 |
| 74 | do | 3-Cl | A | 125-126 | C₁₉H₁₃ClN₂O₄ | 61.89 | 3.55 | 7.59 | 9.61 | 61.97 | 3.47 | 7.30 | 9.77 |
| 75 | do | 4-Cl | A | 160-161 | C₁₉H₁₃ClN₂O₄ | 61.89 | 3.55 | 7.59 | 9.61 | 61.05 | 3.53 | 7.55 | 9.69 |
| 76 | do | 3,4-Cl | A | 161-162 | C₁₉H₁₂Cl₂N₂O₄ | 56.59 | 3.00 | 6.94 | 17.58 | 56.43 | 3.05 | 6.79 | 17.60 |
| 77 | do | 2,4-Cl | A | 155-156 | C₁₉H₁₂Cl₂N₂O₄ | 56.59 | 3.00 | 6.94 | 17.58 | 56.61 | 3.18 | 7.06 | 17.67 |
| 78 | do | 2-NO₂ | A | 171-172 | C₁₉H₁₃N₃O₆ | 60.16 | 3.45 | 11.08 | | 60.30 | 3.50 | 11.04 | |
| 79 | do | 3-NO₂ | A | 142 | C₁₉H₁₃N₃O₆ | 60.16 | 3.45 | 11.08 | | 60.48 | 3.40 | 11.41 | |
| 80 | do | 4-NO₂ | A | 146-148 | C₁₉H₁₃N₃O₆ | 60.16 | 3.45 | 11.08 | | 60.20 | 3.66 | 10.77 | |
| 81 | do | 3-OCH₂O-4 | A | 135-136 | C₂₀H₁₄N₂O₆ | 63.49 | 3.73 | 7.41 | | 63.49 | 3.55 | 7.32 | |
| 82 | do | 2-C₂H₅O | A | 130-131 | C₂₀H₁₆N₂O₅ | 65.93 | 4.43 | 7.69 | | 65.70 | 4.62 | 7.87 | |
| 83 | do | 4-CH₃O | CCl₄ | 131 | C₂₀H₁₆N₂O₅ | 65.93 | 4.43 | 7.69 | | 65.64 | 4.50 | 7.48 | |
| 84 | do | 2,3-CH₃O | A | 154-155 | C₂₁H₁₈N₂O₆ | 63.95 | 4.60 | 7.10 | | 63.59 | 4.50 | 6.90 | |

TABLE 1—Continued

| Compound number | X | R' | Crystal-lization solvent* | M.P. | Formula | Calculated | | | | Found | | | |
|---|---|---|---|---|---|---|---|---|---|---|---|---|---|
| | | | | | | C | H | N | Cl | C | H | N | Cl |
| 85 | do | 3,4-CH₃O | A | 182-184 | C₂₁H₁₈N₂O₆ | 63.95 | 4.60 | 7.10 | | 63.73 | 4.62 | 6.93 | |
| 86 | | 3-n-C₃H₇O | A | 112-113 | C₁₉H₁₆N₂O₅ | 64.77 | 4.58 | 7.95 | | 64.52 | 4.77 | 7.72 | |
| 87 | | 4-n-C₃H₇O | L | 156 | C₁₉H₁₆N₂O₅ | 64.77 | 4.58 | 7.95 | | 64.63 | 4.46 | 7.92 | |
| 88 | | 3-i-C₃H₇O | L | 134 | C₁₉H₁₆N₂O₅ | 64.77 | 4.58 | 7.95 | | 64.94 | 4.27 | 7.95 | |
| 89 | | 4-i-C₃H₇O | L | 136 | C₁₉H₁₆N₂O₅ | 64.77 | 4.58 | 7.95 | | 64.73 | 4.66 | 7.98 | |
| 90 | | 3-n-C₄H₉O | L | 103-104 | C₂₀H₁₈N₂O₅ | 65.56 | 4.95 | 7.65 | | 65.47 | 5.12 | 7.53 | |
| 91 | | 4-n-C₄H₉O | L | 144 | C₂₀H₁₈N₂O₅ | 65.56 | 4.95 | 7.65 | | 65.22 | 4.98 | 7.88 | |
| 92 | | 2-C₆H₅CH₂O | A | 107 | C₂₃H₁₆N₂O₅ | 68.99 | 4.03 | 7.00 | | 69.03 | 4.19 | 6.78 | |
| 93 | | 3-C₆H₅CH₂O | A | 116-117 | C₂₃H₁₆N₂O₅ | 68.99 | 4.03 | 7.00 | | 69.27 | 4.14 | 6.91 | |
| 94 | | 4-C₆H₅CH₂O | A | 150 | C₂₃H₁₆N₂O₅ | 68.99 | 4.03 | 7.00 | | 68.73 | 4.19 | 6.85 | |
| 95 | | 2,6-CH₃O | A | 151 | C₁₈H₁₄N₂O₆ | 61.01 | 3.98 | 7.91 | | 61.11 | 4.16 | 7.81 | |
| 96 | | 2,4-CH₃O | L | 141 | C₁₈H₁₄N₂O₆ | 61.01 | 3.98 | 7.91 | | 61.23 | 4.00 | 7.69 | |
| 97 | | 3,5-CH₃O | A | 178 | C₁₈H₁₄N₂O₆ | 61.01 | 3.98 | 7.91 | | 61.09 | 3.93 | 8.14 | |
| 98 | | 2,5-CH₃O | A | 165 | C₁₈H₁₄N₂O₆ | 61.01 | 3.98 | 7.91 | | 61.23 | 3.60 | 7.93 | |

*A=Ethyl acetate; B=Benzene; D=Dioxane; L=Ligroin.

TABLE II

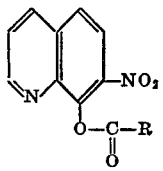

| Compound number | R | Crystal-lization solvent* | M.P. | Formula | Calculated | | | | Found | | | |
|---|---|---|---|---|---|---|---|---|---|---|---|---|
| | | | | | C | H | N | S | C | H | N | S |
| 34 | CH₃ | B | 159-160 | C₁₁H₈N₂O₄ | 56.90 | 3.47 | 12.07 | | 56.73 | 3.59 | 11.77 | |
| 35 | C₂H₅ | L | 106 | C₁₂H₁₀N₂O₄ | 58.53 | 4.09 | 11.38 | | 58.52 | 4.35 | 11.40 | |
| 36 | C₃H₇ | P | 55 | C₁₃H₁₂N₂O₄ | 59.99 | 4.65 | 10.77 | | 60.29 | 4.68 | 10.67 | |
| 37 | furyl | A | 159 | C₁₄H₈N₂O₅ | 59.16 | 2.84 | 9.86 | | 59.28 | 2.92 | 9.79 | |
| 38 | thienyl | A | 175 | C₁₄H₈N₂O₄S | 56.01 | 2.69 | 9.33 | 10.67 | 55.90 | 2.65 | 9.32 | 10.61 |
| 39 | benzofuryl | A | 176-177 | C₁₈H₁₀N₂O₅ | 64.67 | 3.02 | 8.38 | | 64.46 | 2.99 | 7.94 | |
| 40 | naphthyl | A | 152-153 | C₂₀H₁₂N₂O₄ | 69.76 | 3.51 | 8.14 | | 69.95 | 3.61 | 7.82 | |
| 41 | chloronaphthyl | A | 178 | C₂₀H₁₁ClN₂O₄ | 63.42 | 2.92 | 7.39 | | 63.17 | 3.12 | 7.34 | |
| 42 | naphthyl | B | 160-161 | C₂₀H₁₂N₂O₄ | 69.76 | 3.51 | 8.14 | | 69.75 | 3.51 | 7.96 | |
| 43 | coumarinyl | D | 233-234 | C₁₉H₁₀N₂O₆ | 62.99 | 2.78 | 7.73 | | 62.79 | 2.72 | 7.65 | |
| 44 | pyridyl | A | 124-125 | C₁₅H₉N₃O₄ | 61.02 | 3.07 | 14.23 | | 61.04 | 2.74 | 14.06 | |
| 45 | pyridyl | A-P | 171-172 | C₁₅H₉N₃O₄ | 61.02 | 3.07 | 14.23 | | 60.69 | 3.01 | 14.23 | |

TABLE II—Continued

| Compound number | R | Crystallization solvent* | M.P. | Formula | Calculated | | | | Found | | | |
|---|---|---|---|---|---|---|---|---|---|---|---|---|
| | | | | | C | H | N | S | C | H | N | S |
| 99 |  | B-P | 154-155d | C₁₄H₈N₄O₄ | 56.76 | 2.72 | 18.91 | | 56.32 | 2.83 | 18.56 | |
| 100 | 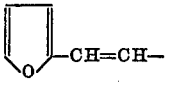 | L | 141-142 | C₁₆H₁₀N₂O₅ | 61.94 | 3.23 | 9.03 | | 61.66 | 3.33 | 8.81 | |
| 101 | 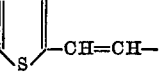 | A | 133-134 | C₁₆H₁₀N₂O₄S | 58.90 | 3.09 | 8.55 | 9.80 | 58.67 | 2.91 | 8.24 | 9.66 |
| 102 | 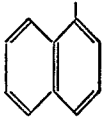 | CCl₄ | 175-176 | C₂₂H₁₄N₂O₄ | 71.35 | 3.81 | 7.56 | | 71.22 | 3.99 | 7.32 | |
| 103 |  | D-W | 187-188 | C₂₂H₁₄N₂O₄ | 71.35 | 3.81 | 7.56 | | 71.42 | 3.67 | 7.41 | |
| 104 | 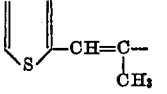 | A | 154-155 | C₁₇H₁₂N₂O₄S | 60.00 | 3.55 | 8.23 | 9.43 | 59.79 | 3.64 | 8.16 | 9.70 |

*A=Ethyl acetate; B=Benzene; D=Dioxane; L=Ligroin; P=Petroleum ether.

The minimum inhibiting concentrations of some of the compounds mentioned in Tables I and II against various microorganisms are given in Table III.

TABLE III

In vitro antibacterial and antifungal minimum inhibiting concentration in μg./ml.

| Compound number | (¹) | (²) | (³) | (⁴) | (⁵) | (⁶) | (⁷) | (⁸) | (⁹) |
|---|---|---|---|---|---|---|---|---|---|
| 1 | 40 | 80 | 10 | 40 | 160 | 40 | 0.62 | 2.5 | 20 |
| 2 | 40 | 40 | 20 | 40 | 40 | 40 | 1.25 | 5 | |
| 3 | 20 | 20 | 10 | 20 | 40 | 40 | 5 | 10 | 20 |
| 4 | 80 | 160 | 20 | 40 | 40 | 80 | 1.25 | 5 | |
| 5 | 40 | 40 | 20 | 20 | 40 | 20 | 10 | 5 | 160 |
| 6 | 40 | 40 | 20 | 40 | 40 | 40 | 1.25 | 5 | 80 |
| 7 | 20 | 20 | 10 | 10 | 40 | 40 | 0.62 | 5 | 20 |
| 8 | 40 | 80 | 20 | 80 | 40 | 80 | 1.25 | 20 | |
| 9 | 20 | 20 | 10 | 20 | 40 | 40 | 0.62 | 5 | 20 |
| 10 | 20 | 20 | 20 | 40 | 40 | 40 | 2.5 | 20 | 40 |
| 11 | 20 | 40 | 20 | 40 | 40 | 40 | 2.5 | 20 | 40 |
| 12 | 20 | 40 | 20 | 40 | 40 | 40 | 2.5 | 20 | 40 |
| 13 | 20 | 40 | 20 | 40 | 40 | 40 | 1.25 | 20 | |
| 14 | 20 | 40 | 10 | 20 | 80 | 40 | 10 | 20 | 20 |
| 15 | 40 | 80 | 10 | 80 | 40 | 80 | 2.5 | 40 | |
| 16 | 20 | 40 | 20 | 40 | 40 | 40 | 2.5 | 40 | 40 |
| 17 | 20 | 20 | 10 | 20 | 20 | 40 | 1.25 | 5 | |
| 18 | 20 | 20 | 10 | 20 | 20 | 40 | | 5 | 20 |
| 19 | | | | | | | 5 | 5 | 10 |
| 20 | 40 | 40 | 20 | 20 | 40 | 40 | 1.25 | 5 | 20 |
| 21 | 20 | 40 | 10 | 20 | 40 | 80 | 1.25 | 5 | 20 |
| 22 | 20 | 40 | 20 | 40 | 40 | 40 | 1.25 | 20 | 40 |
| 23 | | | | | | | 2.5 | | 40 |
| 24 | | | | | | | 10 | 20 | 20 |
| 25 | | | | | | | 10 | 80 | 20 |
| 26 | | | | | | | 10 | 40 | 20 |
| 27 | | | | | | | 5 | 20 | |
| 29 | 20 | | 20 | | | | 40 | 80 | |
| 30 | 40 | 40 | 20 | 20 | 40 | 40 | | 40 | |
| 31 | 20 | 20 | 10 | 20 | 40 | 20 | 0.62 | 5 | 40 |
| 32 | 20 | 80 | 20 | 20 | 80 | 40 | 40 | 20 | 40 |
| 33 | 20 | 40 | 10 | 20 | 40 | 20 | 40 | 10 | 40 |
| 34 | 5 | 10 | 5 | 10 | 40 | 10 | 1.25 | 12.5 | 20 |
| 35 | 20 | 160 | 10 | 20 | 20 | 160 | 0.62 | 10 | 20 |
| 37 | 20 | 20 | 10 | 20 | 40 | 40 | 0.62 | 2.5 | 20 |
| 38 | 20 | 20 | 5 | 10 | 80 | 40 | 0.62 | 2.5 | 20 |
| 39 | 20 | 40 | 20 | 40 | 40 | 40 | 10 | 40 | 40 |
| 40 | | | | | | | 10 | 10 | 5 |
| 41 | | | | | | | 1.25 | | |
| 42 | 20 | | | 5 | | 80 | 10 | 20 | 10 |
| 43 | 40 | | 20 | 40 | | | 80 | 10 | 160 |

TABLE III.—Continued

| Compound number | (¹) | (²) | (³) | (⁴) | (⁵) | (⁶) | (⁷) | (⁸) | (⁹) |
|---|---|---|---|---|---|---|---|---|---|
| 44 | 20 | 20 | 10 | 10 | 40 | 20 | | 40 | 40 |
| 46 | 20 | 40 | 20 | 20 | 80 | 20 | 80 | 20 | 40 |
| 49 | 20 | | 20 | | 40 | | | 40 | 80 |
| 50 | 10 | 80 | 10 | 20 | 80 | 80 | | | 40 |
| 53 | 20 | 40 | 10 | 20 | 80 | 40 | | 10 | 40 |
| 56 | | | | | | | 40 | | |
| 57 | | | | | | | 80 | 20 | |
| 58 | | | | | | | 40 | 80 | |
| 63 | 20 | 40 | 10 | 20 | 40 | 40 | | 20 | |
| 64 | | | | | | | | 10 | 40 |
| 68 | | | | | | | | 10 | |
| 70 | 20 | 80 | 10 | 20 | 80 | 80 | | 10 | |
| 70 | 40 | 40 | 20 | 40 | | | | 40 | 80 |
| 98 | 40 | 80 | 10 | 10 | | 40 | | 20 | 40 |

[1] E. coli 100.
[2] Proteus 0.
[3] Bac. subtilis.
[4] St. aureus SG 511.
[5] Str. pyogenes humanus (gr. A).
[6] Salmonella typhi.
[7] Mycobact. tubercul.
[8] Trichoph. mentagrophytes.
[9] Candida albicans.

We claim:
1. A 7-nitro-8-hydroxy-quinoline ester of the formula:

wherein X represents a

—CH=CH— or —C=CH—
                    |
                    R' wherein R' is methyl, ethyl or phenyl and R represents a group of the formula:

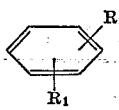

wherein each of $R_1$ and $R_2$ represents hydrogen, chlorine, nitro, methyl or methoxy.

2. 7-nitro-8-(α-methyl)cinnamoyloxy-quinoline.

References Cited

UNITED STATES PATENTS

| | | | |
|---|---|---|---|
| 3,136,768 | 6/1964 | Griot et al. | 260—287 |
| 3,297,525 | 1/1967 | Grier | 260—287 |
| 3,298,911 | 1/1967 | Renz et al. | 260—287 |
| 3,307,970 | 3/1967 | Grier | 260—287 |
| 3,362,960 | 1/1968 | Hodel | 260—287 |
| 3,632,590 | 1/1972 | Leroi | 260—287 R |

FOREIGN PATENTS

| | | | |
|---|---|---|---|
| 1,089,868 | 11/1967 | Great Britain | 260—287 |
| 1,148,405 | 4/1969 | Great Britain | 260—287 |
| 698,711 | 10/1953 | Great Britain | 260—287 |

OTHER REFERENCES

Chem. Abstracts 64:8156b.

HENRY R. JILES, Primary Examiner

G. T. TODD, Assistant Examiner

U.S. Cl. X.R.

260—250 R, 250 A, 256.4, 287 R, 287 X; 424—250; 251, 258